Aug. 9, 1949.  P. H. SATRE  2,478,426
RETRACTABLE UNDERCARRIAGE FOR AIRCRAFT
Filed Dec. 29, 1945  2 Sheets-Sheet 1

INVENTOR:
PIERRE HENRI SATRE
By:
Haseltine, Lake & Co.
AGENTS

Aug. 9, 1949.  P. H. SATRE  2,478,426
RETRACTABLE UNDERCARRIAGE FOR AIRCRAFT
Filed Dec. 29, 1945  2 Sheets-Sheet 2

Inventor
PIERRE HENRI SATRE
by Haseltine, Lake & Co.
Attorneys

Patented Aug. 9, 1949

UNITED STATES PATENT OFFICE 2,478,426

RETRACTABLE UNDERCARRIAGE FOR AIRCRAFT

Pierre Henri Satre, Toulouse, France, assignor to S. A. Societe Nationale De Constructions Aeronautiques Du Sud-Est Application December 29, 1945, Serial No. 638,363
In France June 11, 1945

13 Claims. (Cl. 244—102)

This invention relates to improvements in retracting landing gears for aircrafts.

It is known that in order to reduce aerodynamic drag of aircrafts their landing gears may be retractable in flight so that the wheels and the landing legs are housed in recesses provided at the rear of the engine-nacelles or within the structure of the wing, more particularly in aircraft which have no lateral engines. However, in all known devices, the retracting of the landing gear is obtained by a complete displacement of the landing gear as a whole, the wheel remaining in the same position with respect to the corresponding landing leg.

According to such an arrangement the wheel will not always be located, when retracted, in the most favorable position in accordance with the aircraft's own structure. Thus for example in the event where the landing gear is raised parallel to the plane of the wheels, with a view to be retracted within the rear part of the engine nacelle or of the wing, the wheels shall be vertically located in the vertical plane corresponding to their landing position. Consequently, if it is desired to obtain total retraction of the wheels, it is necessary to provide a comparatively thick wing or a comparatively large housing within the most resistant part of the wing, whereby the lift-drag ratio of the machine is reduced.

With a view to provide a remedy to the above drawbacks, the main object of the invention is to provide an improved method for locating the landing gear after retraction in the most suitable position without decreasing of the aircraft lift-drag ratio.

Another object of the invention is to provide a landing gear in which the wheels may swivel with respect to said landing gear during retraction, from their landing position to a position adapted to maintain the aircraft lift-drag ratio.

Another object of the invention is to provide a landing gear in which each wheel may pivot about the longitudinal axis of the corresponding landing leg during retraction, from its landing position to a position perpendicular to the longitudinal axis of the plane.

Still a further object of the invention is to provide a landing gear of the character described in which the pivotal movement of the wheel about the longitudinal axis of the corresponding landing leg is controlled by the movement of said landing leg both during retraction or extension of the same.

Further objects and advantages of the invention will be apparent from the following detailed description of an embodiment of the invention, given by way of example, reference being had to the accompanying drawings, in which.

Figure 1:
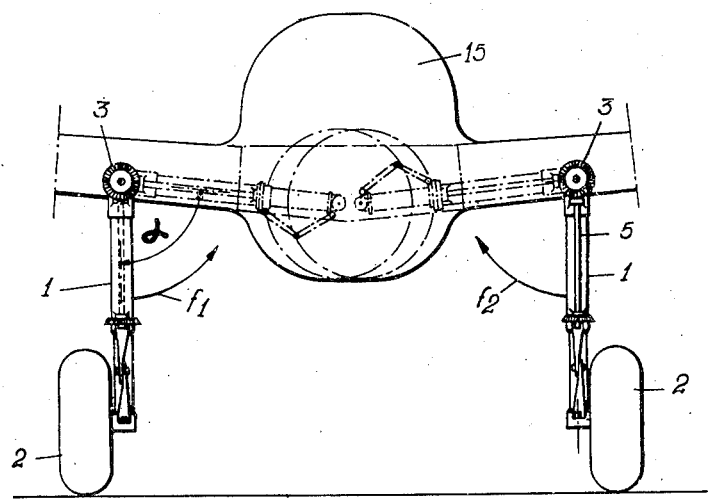
Fig. 1 is a general diagrammatic front elevational view of a retracting landing gear according to the invention.
Figure 2:
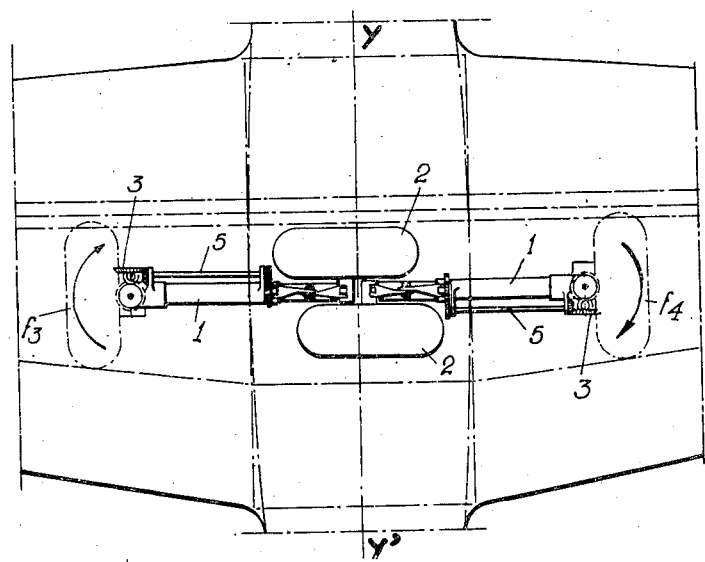
Fig. 2 is a plan view of the apparatus shown in Fig. 1, the landing gear being in retracted position and the upper part of the wings and of the fuselage being removed to facilitate comprehension.
Figure 3:
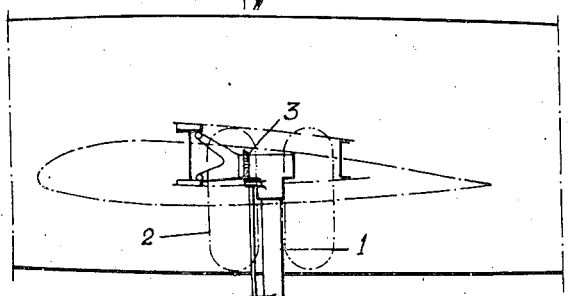
Fig. 3 is a side elevational view of the apparatus shown in Fig. 1.
Figure 4:
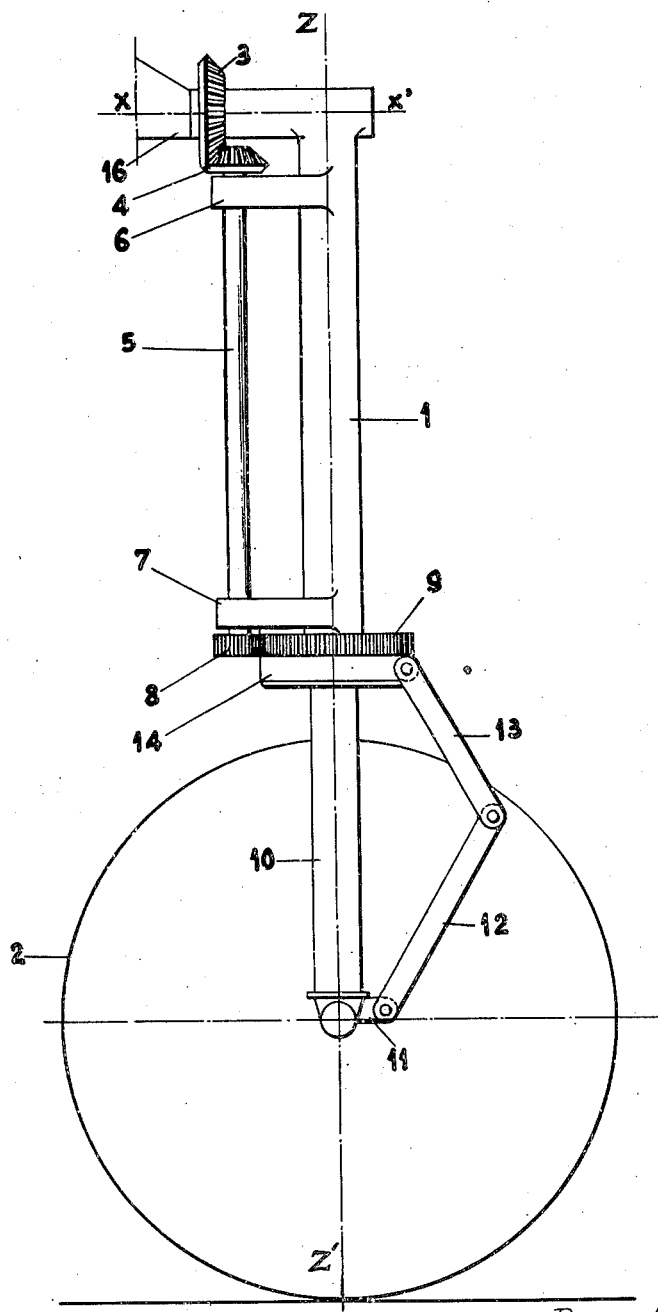
Fig. 4 is an enlarged view showing an embodiment of the kinematic connection ensuring the automatic pivoting of a wheel about the axis of the corresponding landing leg.

In the exemplary embodiment illustrated, the aircraft is a single-engine machine with low-wings wherein the wheels in raised position are retracted within the lower part of the fuselage.

In the embodiment shown, the landing legs 1 supporting the wheels 2 are hinged about two axes XX' parallel to the longitudinal axis YY' of the aircraft. Each of said landing legs 1 may pivot through substantially 90° about the corresponding axes XX' so as to turn aside toward the fuselage 15. The means adapted to cause such pivotal motion are immaterial in the present invention.

The swivelling movement of each wheel 2 about the axes ZZ' of the corresponding landing leg 1 is obtained in the following way: a bevel gear 3 centered on an axis XX' and secured to a fixed part of the plane, such as the fixed support 16 acting as hinge for the landing leg 1 meshes a bevel gear 4 keyed at the end of a shaft 5 parallel to axis ZZ' and rotating in two bearings 6 and 7 rigidly secured to the landing leg 1. At the other end of shaft 5 is keyed a pinion 8 in mesh with another pinion 9 angularly linked to the lower part 10 of the landing leg 1 and coaxial to said lower part. On said part 10, which is axially movable, is mounted the hub of the wheel 2. Said part 10 constitutes in the embodiment shown the inner tube of the shock absorbing device and comprises at its lower end a yoke 11 engaging in the usual way the lower arm 12 of a compass member. The upper arm 13 of said compass member is hinged to a sleeve member 14 rigidly secured to the bevel pinion 9 and angularly connected to the tube or similar member 10 in order to allow for axial sliding movement of said tube with respect to the landing leg 1 in the well known manner.

The device according to the invention operates as follows: the landing gear being in landing position, as the pilot actuates the retracting device, each of the landing legs 1 pivots about the corresponding axis XX', the left landing leg rotating in the direction of the arrow $f^1$ and the right one rotating in the direction of the arrow $f^2$. Said pivotal movement induces the rotation of the pinion 3 which in turn rotates pinions 4 and 8 and pinion 9 meshing with pinion 8. Said last pinion 9 angularly connected to wheel supporting member 10 induces a swivelling movement of said member about the longitudinal axis ZZ' of the corresponding landing leg 1. The wheel 2 pivots with the compass member 12—13 about the same axis ZZ' in the direction of the arrow $f^3$ for the left wheel and of the arrow $f^4$ for the right wheel. By suitably determining the ratio of the set of gears 3, 4 and 8, it is possible to produce for the value of the landing leg displacement about the axis XX', from its landing position to its retracted position, an angular displacement of the tube 10 substantially equal to 90° and consequently a similar displacement of the wheel 2 with respect to the axis of said tube, so that in retracted condition the wheels 2 will be parallel as shown.

The form of embodiment represented has only been given by way of example and it is clear that the kinematic system described above may be replaced by any other suitable system comprising for example levers and connecting rods, cams or the like. Similarly, while in the embodiment shown the pivotal displacement of the wheel is directly dependent on that of the landing leg, there may be imposed different laws of relative rotation to said two members; for example, the rotation of the wheel may be negligible at the start of the rotation of the landing gear and may be effected rapidly at the end of said rotation. In that case, the swivelling displacement of the wheel will be effected by any appropriate mechanical, electrical, pneumatical or hydraulical device, whether separate or not from the retracting device of the landing gear but operatively connected to the same in order to fulfill the kinematic law selected for said displacement.

It will be obvious that the invention may be applied to any type of airplane and that the wheels instead of being retractable within the fuselage, could be retractable within the wings or any other part of the airplane structure.

In all forms of embodiment however, all known interlocking devices may be provided and adapted to the system used for pivoting the wheel, as well as all devices such as shutters or doors intended to close, either automatically or not, the landing gear housing recesses provided within the aircraft after retraction or extension of said landing gear, in order to maintain a satisfactory lift drag ratio of the plane.

Retractable undercarriages improved as hereinabove described constitute novel industrial products claimed as such by the invention.

What I claim as my invention and desire to secure by Letters Patent is:

1. In a retracting landing gear for aircraft of the type in which two rigid landing legs are pivoted for retraction on axes substantially parallel to the longitudinal axis of said aircraft, landing wheels mounted on said landing legs, adapted to swivel about longitudinal axes of said landing legs, means for simultaneously swivelling said wheels about said longitudinal axes, when pivoting said landing legs, means for causing, in retracted condition, said wheels to be juxtaposed with their axes substantially parallel to the longitudinal axis of the aircraft and means provided within said aircraft for housing said wheels in said juxtaposed position.

2. In a retracting landing gear for aircraft of the type in which two rigid landing legs are pivoted for retraction on axes substantially parallel to the longitudinal axis of said aircraft, landing wheels mounted on said landing legs, adapted to swivel about longitudinal axes of said landing legs, means for simultaneously swivelling said wheels about said longitudinal axes, when pivoting said landing legs, means for causing, in retracted condition, said wheels to be juxtaposed with their axes substantially parallel to the longitudinal axis of the aircraft, means for controlling said swivelling means by the pivotal displacement of said landing legs and means provided within said aircraft for housing said wheels in said juxtaposed position.

3. A retracting landing gear for aircraft of the type in which two rigid landing legs are pivoted for retraction on axes substantially parallel to the longitudinal axis of said aircraft, as claimed in claim 2, in which the means for swivelling and for locating each wheel comprises a set of pinions the first of which is rigidly connected to the aircraft and the last to the wheel.

4. In a retracting landing gear for aircraft of the type in which two rigid landing legs are pivoted for retraction on axes substantially parallel to the longitudinal axis of said aircraft and are substantially aligned with respect to each other when in retracted condition, landing wheels mounted on said landing legs, adapted to swivel about longitudinal axes of said landing legs, means for simultaneously swivelling said wheels inversely about said longitudinal axes, when pivoting said landing legs, means for causing, in retracted condition, said wheels to be juxtaposed with their axes substantially parallel to the longitudinal axis of the aircraft and to be outwardly disposed with respect to said landing legs, and means provided within said aircraft for housing said wheels in said juxtaposed position.

5. In a retracting landing gear for aircraft of the type in which two rigid landing legs are pivoted for retraction on axes substantially parallel to the longitudinal axis of said aircraft, landing wheels mounted on said landing legs, adapted to swivel about longitudinal axes of said landing legs, means for simultaneously swivelling said wheels inversely about said longitudinal axes, when pivoting said landing legs, means for causing, in retracted condition, said wheels to be juxtaposed with their axes substantially parallel to the longitudinal axis of the aircraft and to be outwardly disposed with respect to said landing legs and means provided within said aircraft for housing said wheels in said juxtaposed position.

6. In a retracting landing gear for aircraft of the type in which two rigid landing legs are pivoted for retraction on axes substantially parallel to the longitudinal axis of said aircraft, landing wheels mounted on said landing legs, adapted to swivel about longitudinal axes of said landing legs, means for simultaneously swivelling said wheels inversely about said longitudinal axes, when pivoting said landing legs, means for causing, in retracted condition, said wheels to be juxtaposed with their axes substantially parallel to the longitudinal axis of the aircraft and to be outwardly disposed with respect to said landing legs, means for controlling said swivelling means by the pivotal displacement of said landing legs and means provided within said aircraft for housing said wheels in said juxtaposed position.

7. A retracting landing gear for aircraft of the type in which two rigid landing legs are pivoted for retraction on axes substantially parallel to the longitudinal axis of said aircraft, as claimed in claim 6, in which the means for swivelling and for locating each wheel, comprises a set of pinions the first of which is rigidly connected to the aircraft and the last to the wheel.

8. In a retracting landing gear for aircraft of the type in which two rigid landing legs are pivoted for retraction on axes substantially parallel to the longitudinal axis of said aircraft and are substantially aligned with respect to each other when in retracted condition, landing wheels mounted on said landing legs, adapted to swivel about longitudinal axes of said landing legs, means for simultaneously swivelling said wheels inversely about said longitudinal axes, when pivoting said landing legs, through an angle of substantially 90°, means for causing, in retracted condition, said wheels to be juxtaposed with their axes substantially parallel to the longitudinal axis of the aircraft and to be outwardly disposed with respect to said landing legs, and means provided within said aircraft for housing said wheels in said juxtaposed position.

9. In a retracting landing gear for aircraft of the type in which two rigid landing legs are pivoted for retraction on axes substantially parallel to the longitudinal axis of said aircraft and are substantially aligned with respect to each other when in retracted condition, landing wheels adapted to swivel about longitudinal axes of said landing legs, shock absorbers having an upper portion associated to the corresponding landing leg and a lower portion associated to the corresponding landing wheel, compass members one arm of which is connected to the lower portion of the corresponding shock absorber, the other arm being angularly linked to the corresponding landing leg, means for simultaneously swivelling said wheels, said lower parts and said compass members inversely about said longitudinal axes, when pivoting said landing legs, means for causing, in retracted condition, said wheels to be justaposed with their axes substantially parallel to the longitudinal axis of the aircraft and to be outwardly disposed with respect to said landing legs and means provided within said aircraft for housing said wheels in said juxtaposed position.

10. In a retracting landing gear for aircraft of the type in which two rigid landing legs are pivoted for retraction on axes substantially parallel to the longitudinal axis of said aircraft and are substantially aligned with respect to each other when in retracted condition, landing wheels adapted to swivel about longitudinal axes of said landing legs, shock absorbers having an upper portion associated to the corresponding landing leg and a lower portion associated to the corresponding landing wheel, compass members one arm of which is connected to the lower portion of the corresponding shock absorber, the other arm being angularly linked to the corresponding landing leg, means for simultaneously swivelling said wheels, said lower parts and said compass members inversely about said longitudinal axes, when pivoting said landing legs, means for causing, in retracted condition, said wheels to be juxtaposed with their axes substantially parallel to the longitudinal axis of the aircraft and to be outwardly disposed with respect to said landing legs, means for controlling said swivelling means by the pivotal displacement of said landing legs and means provided within said aircraft for housing said wheels in said juxtaposed position.

11. In a retracting landing gear for aircraft of the type in which two rigid landing legs are pivoted for retraction on axes substantially parallel to the longitudinal axis of said aircraft and are substantially aligned with respect to each other when in retracted condition, landing wheels adapted to swivel about longitudinal axes of said landing legs, shock absorbers having an upper portion associated to the corresponding landing leg and a lower portion associated to the corresponding landing wheel, compass members one arm of which is connected to the lower portion of the corresponding shock absorber, the other arm being angularly linked to the corresponding landing leg, means for simultaneously swivelling said wheels, said lower parts and said compass members inversely about said longitudinal axes, when pivoting said landing legs, means for causing, in retracted condition, said wheels to be juxtaposed with their axes substantially parallel to the longitudinal axis of the aircraft and to be outwardly disposed with respect to said landing legs, means for controlling said swivelling means proportionally to the pivotal displacement of said landing legs and means provided within said aircraft for housing said wheels in said juxtaposed position.

12. A retracting landing gear for aircraft of the type in which two rigid landing legs are pivoted for retraction on axes substantially parallel to the longitudinal axis of said aircraft, as claimed in claim 11, in which the means for swivelling and for locating each wheel, comprises a stationary gear wheel carried by the aircraft, a second gear wheel carried by the landing leg for meshing said first gear wheel, and a set of gears adapted to transmit to the movable unit, comprising the wheel, the compass member and the lower part of the shock absorber, the displacement of said second gear wheel induced by the pivotal movement of the landing leg.

13. A retracting landing gear for aircraft operated by pivoting means comprising landing wheels, retracting landing legs adapted to support said wheels, means for simultaneously swivelling said wheels about the longitudinal axes of said landing legs when retracting the same. means for causing, in retracted condition, said wheels to be located in vertical planes perpendicular to the vertical plane of symmetry of the aircraft, and housing means provided within said aircraft for housing said wheels in retracted condition. whereby they occupy a position adapted to maintain the aircraft lift drag ratio.

PIERRE HENRI SATRE.

REFERENCES CITED

The following references are of record in the file of this patent:

UNITED STATES PATENTS

| Number | Name | Date |
|---|---|---|
| 2,403,835 | Villepigue | July 9, 1946 |

FOREIGN PATENTS

| Number | Country | Date |
|---|---|---|
| 676,768 | Germany | June 10, 1939 |